Aug. 25, 1964 T. PETERSEN 3,145,469
PIPE CUTTER
Filed July 3, 1962
FIG. 1
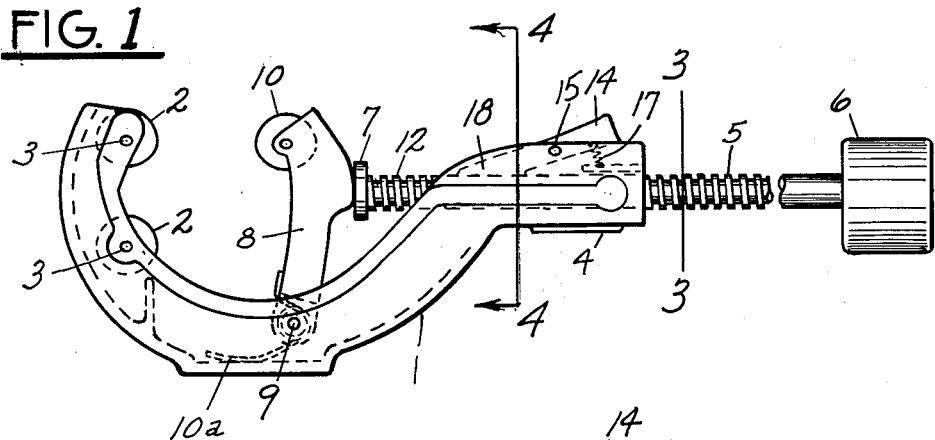
FIG. 2
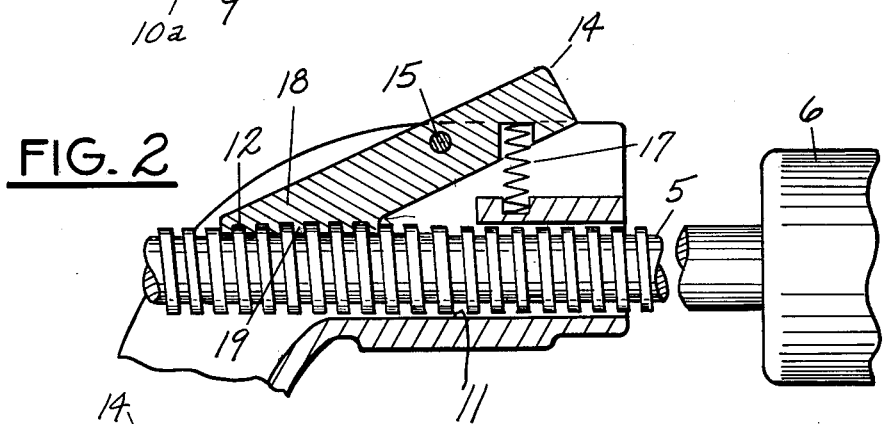
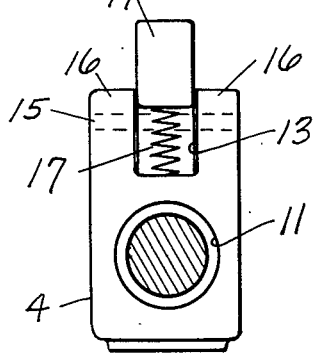
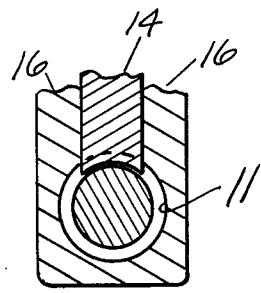
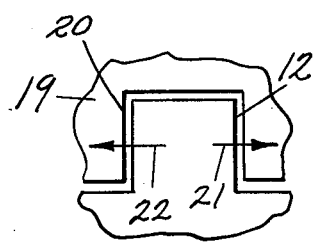
FIG. 3     FIG. 4     FIG. 5
INVENTOR.
Thowald Petersen
BY
Ralph Hammar
Attorney

United States Patent Office 3,145,469
Patented Aug. 25, 1964

3,145,469
PIPE CUTTER
Thorvald Petersen, Erie, Pa., assignor to Reed Manufacturing Company, Erie, Pa., a corporation of Pennsylvania
Filed July 3, 1962, Ser. No. 207,220
1 Claim. (Cl. 30—102)

This invention is a pipe cutter which is quickly set to different sizes and in which the pressure screw need be turned only to apply cutting pressure.

In the drawing, FIG. 1 is a side elevation of a pipe cutter, FIG. 2 is a longitudinal section through the pressure screw, FIG. 3 is a section on line 3—3 of FIG. 1, FIG. 4 is a section on line 4—4 of FIG. 1, and FIG. 5 is a view illustrating the forces on the thread of the pressure screw and of the associated pawl.

The common parts of the cutter are readily identified, 1 being the frame of C-shape and channel section having at one end guide rolls 2 journaled on pins 3 and having at the other end a hub 4 for a pressure screw 5 with a handle 6 fixed to its outer end and with a head 7 on its inner end engaging the outer end of an arm 8. The inner end of the arm 8 is pivoted on a pin 9 and the outer end of the arm has journaled therein a cutting wheel 10. The rolls 2 cradle the pipe or tubing on an axis perpendicular to the plane of the cutting wheel 10 and the pipe may be cut by rotating the cutter about the axis of the pipe while applying pressure through the pressure screw. The parts so far described are or may be of common construction.

The hub 4 has a bore 11 slidably receiving the pressure screw 5 which preferably has a thread of the square, acme or buttress form presenting abrupt shoulders 12 toward the handle end of the pressure screw. On the upper side of the hub 4 is a channel 13 receiving a pawl 14 pivoted on a pin 15 extending crosswise between the sides 16 of the channel. A spring 17 to the rear of the pin 15 urges the pawl in a counterclockwise direction as viewed in FIG. 1, forcing the inner end 18 of the pawl down against the upper surface of the pressure screw. The inner end of the pawl has a threaded section 19 which serves as a nut cooperating with the pressure screw.

The pressure screw can be used in the ordinary manner to develop cutting pressure on the cutting wheel 10. When pressure is being applied through the pressure screw, the abrupt shoulders 12 on the threads of the pressure screw exert a pressure on the cooperating abrupt shoulders 20 on the threaded section 19 of the pawl, the force being in the direction of arrow 21 (FIG. 5) and exerting a torque about the pivot pin 15 of the pawl tending to urge the threaded section 19 of the pawl into engagement with the threads of the pressure screw. The pressure may be released at any time by pushing downward on the outer end of the pawl 14, thereby lifting the threaded section 19 out of contact with the threads of the pressure screw. As soon as the threaded section 19 is disengaged, a spring 10a coiled about the pin 9 moves the pressure screw to the right as viewed in FIG. 1, thereby moving the cutting wheel 10 away from the rolls 2 and permitting ready removal of the cutter from the pipe. The cutting wheel can be advanced against the pipe by merely pushing inward on the handle 6 on the outer end of the pressure screw. This exerts a force in the direction of arrow 22 creating a torque acting in a clockwise direction about the pin 15 and lifting the threaded section 19 of the pawl out of engagement with the threads of the pressure screw. As soon as resistance to further inward movement of the cutting wheel is encountered, further advance of the cutting wheel toward the pipe is obtained by turning the pressure screw in the usual manner.

In the use of the cutter, the pipe or tubing to be cut is cradled on the rolls 2 and the handle 6 of the pressure screw is pushed inward, bringing the cutting wheel 10 into engagement with the outer surface of the pipe. The handle 6 is then turned to develop the desired cutting pressure which is maintained until the cut is completed. The outer end of the pawl 14 is then pushed downward, releasing the cutting wheel and permitting it to be returned to the open position by spring 10a. It is only necessary to turn the handle 6 to develop and maintain the cutting pressure during the cutting operation. At no time is it necessary to manually open the cutter or to back off the pressure screw by turning the handle 6. Upon release of the pawl 14 the spring 10a both moves the wheel 10 to the open position and retracts the pressure screw.

What is claimed as new is:

A pipe cutter having a C-shaped frame with means at one end for guiding the cutter for relative rotation with respect to the pipe in a plane perpendicular to the longitudinal axis of the pipe, a wheel having a cutting edge in said plane, an arm having one end pivoted on the frame and the other end mounting the wheel for movement toward and away from the pipe, spring means urging the arm in the direction to move the wheel away from the pipe, said other end of the frame having a bore presented toward the first end of the frame and a longitudinal slot intersecting the bore, a pressure screw slidably mounted in said bore and having its outer end provided with a handle and its inner end in thrust relation to said arm, said screw having a thread with an abrupt shoulder presented toward the handle, a pawl in said slot, a pivot for the pawl on the frame on an axis crosswise of the pressure screw, said pawl having a threaded end extending and first engaging the pressure screw forward of the pivot, means urging the threaded end of the pawl into engagement with the pressure screw, and provisions for pivoting the threaded end of the pawl away from the pressure screw.

References Cited in the file of this patent
UNITED STATES PATENTS

| | | |
|---|---|---|
| 680,866 | Katzki | Aug. 20, 1901 |
| 1,380,653 | Kilgour | June 7, 1921 |
| 2,283,572 | Petersen | May 19, 1942 |
| 3,022,575 | Wright | Feb. 27, 1962 |